US012473436B2

(12) United States Patent
Knight et al.

(10) Patent No.: US 12,473,436 B2
(45) Date of Patent: Nov. 18, 2025

(54) CORROSION INHIBITING PASTE FOR AIRCRAFT USE

(71) Applicant: THE PATENT WELL LLC, Fort Worth, TX (US)

(72) Inventors: Chad Knight, Dodd City, TX (US); Kent Boomer, Aledo, TX (US); Ryan Merritt, Grapevine, TX (US); Dylan Knight, Dodd City, TX (US); Matt Boyd, Fort Worth, TX (US)

(73) Assignee: The Patent Well LLC, Fort Worth, TX (US)

( * ) Notice: Subject to any disclaimer, the term of this patent is extended or adjusted under 35 U.S.C. 154(b) by 512 days.

(21) Appl. No.: 17/817,487

(22) Filed: Aug. 4, 2022

(65) Prior Publication Data

US 2023/0042294 A1    Feb. 9, 2023

Related U.S. Application Data

(60) Provisional application No. 63/363,030, filed on Apr. 15, 2022, provisional application No. 63/260,002, filed on Aug. 6, 2021.

(51) Int. Cl.
| | | |
|---|---|---|
| *C09D 5/08* | (2006.01) | |
| *C09D 5/10* | (2006.01) | |
| *C09D 5/24* | (2006.01) | |
| *C09D 7/40* | (2018.01) | |
| *C09D 7/62* | (2018.01) | |

(52) U.S. Cl.
CPC ............ *C09D 5/106* (2013.01); *C09D 5/084* (2013.01); *C09D 5/086* (2013.01); *C09D 5/24* (2013.01); *C09D 7/62* (2018.01); *C09D 7/69* (2018.01)

(58) Field of Classification Search
CPC . C09D 5/106; C09D 7/69; C09D 7/62; C09D 5/084; C09D 5/086; C09D 5/24
See application file for complete search history.

(56) References Cited

U.S. PATENT DOCUMENTS

| | | | | |
|---|---|---|---|---|
| 4,749,412 A | * | 6/1988 | Ciuba | C09D 5/08 252/389.52 |
| 2022/0298364 A1 | * | 9/2022 | Merritt | C09C 1/62 |

FOREIGN PATENT DOCUMENTS

| | | |
|---|---|---|
| GB | 2608669 A | 1/2023 |
| WO | 2017094868 A1 | 6/2017 |

OTHER PUBLICATIONS

GB Intellectual Property Office, GB patent application GB2211460.7, Examination Report (Nov. 28, 2024).

* cited by examiner

*Primary Examiner* — Haidung D Nguyen
(74) *Attorney, Agent, or Firm* — Daniel D. Chapman; Jack V. Musgrove

(57) ABSTRACT

A chemical composition comprising a mixture of a non-curing organic polymer base with a viscosity between 300 and 10,000 centipoises at 20 degrees C.° and a molecular weight of between 1,000 and 100,000. Into the base is mixed at least one of: metal particles (coated or uncoated), inert particles and non-metal corrosion inhibitors such that reaches a viscosity of between 9,000 and 10,000,000 centipoises. The result is a paste that is useful in applying to metal aircraft parts to help prevent corrosion, including galvanic corrosion.

25 Claims, 2 Drawing Sheets

CORROSION INHIBITING PASTE FOR AIRCRAFT USE

This utility application claims the benefit of, priority to, and incorporates by reference U.S. provisional application No. 63/363,030, filed Apr. 15, 2022 and U.S. provisional application No. 63/260,002, filed Aug. 6, 2021.

FIELD OF THE INVENTION

Corrosion inhibiting compounds for aircraft use, including pastes with or without particles for use on, or with, a variety of aircraft assemblies.

BACKGROUND

Corrosion in aircraft is a multibillion-dollar problem and corrosion inhibiting compounds (CICs) or corrosion prevention compounds are a huge industry. There are many possible corrosion sites in an aircraft, including joints having dissimilar materials close to one another or in contact. These joints are often subject to vibrational stress. Often, the joints are also subject to both thermal and pressure cycling as the aircraft takes off, climbs, and descends. Also, conditions, especially on an aircraft exterior, can vary from dry to wet, acidic to basic.

CICs are widely used in the aircraft industry to protect aircraft structures, materials, spare parts and assemblies from physical and chemical attack. They come in a variety of forms with a number of different properties and uses.

A complication in the development of CICs is the desire for them to be environmentally friendly and not hazardous. Unfortunately, some of the best corrosion inhibitors have contained chromates (Cr +6) which present health and environmental concerns. It is no surprise that the development of effective, safe, chromate free CICs has been a difficult task.

Direct or close contact between two or more different metal alloys or a metal alloy and a carbon fiber composite material may occur in aircraft. These assemblies are typically subject to environmental and/or mechanical stresses. Joints may include fasteners and/or adhesives for bonding or maintaining two or more discreet panels or members as an integrated assembly. Joint compounds are often required to inhibit corrosion.

Corrosion may also affect fasteners used in aircraft, such as bolts, screws, and rivets. The fasteners may be made from a number of materials, typically metallic materials such as aluminum alloys, steel, and titanium. Fasteners may also be installed with a corrosion inhibiting wet coating, typically applied just prior to installation. Zinc chromate, wet, and unthinned is a wet install sealant that has been used with fasteners. Single component polysulfides have also been used.

Adhesives, which typically create a bond, are also sometimes used in the installation of aircraft fasteners, to impart strength to a joint. They may also help make a moisture-proof seal, thus helping inhibit corrosion. Sometimes epoxy is used to coat a fastener just prior to installation, to help prevent corrosion and add bonding strength to the joint. Some of these prior art CICs may contain potentially harmful aromatic solvents or petroleum distillates.

Corrosion inhibiting compounds may be classified as multi-component, which will mix and dry (cure), or single component that may stay moist over time (non-drying) and over a wide variation in temperature.

SUMMARY OF INVENTION

The invention includes a number of Corrosion Inhibiting Pastes (CIPs) and methods of applying and using such CIPs, in some embodiments on aircraft assemblies.

The CIPs include a base (note: this term is not referencing pH) having a number of properties and including and excluding certain components. The CIPs include, in some embodiments, the base combined with particles, including metallic particles, inert particles and corrosion inhibitors, these typically having certain structure, dimensions and chemical components, resulting in unique and improved properties.

Some bases include an organic, 100% solids, carbon-based polymer, which may include oily or fatty polymers, lipids, esters, and may be of plant, mineral or animal origin. The organic polymer base may, in some embodiments, have a molecular weight between 1,000 and 100,000, or more preferably, 5,000 and 75,000. The base may be non-aqueous, non-toxic, and bio-friendly, and in some embodiments is a plant-derived base.

The CIP includes at least a base. In some embodiments, the CIP includes the base and one or more additional compositions from one or more of the following three groups: coated or uncoated metal particles, inert particles, and corrosion inhibitors.

Coated or uncoated metal or metal alloy particles may inhibit corrosion of a metallic substrate as, in some embodiments, they may act as sacrificial anodes when the CIP is applied to a metal or metals, thus providing, primarily, a corrosion inhibiting function.

The inert particles are termed "inert" as they do not, primarily, or typically have a significant corrosion inhibiting function. Rather, they may be added primarily for other purposes such as flow characteristics, color, UV inhibitors (blockers), flame and fire retardant purposes, and thickening and sag characteristics.

The corrosion inhibitors are chemicals, usually added, in some embodiments, as powders, non-metallic (but may include organometallic) compositions that function as corrosion-inhibitors when the paste is applied to a substrate, including a metallic substrate.

The CIP may be free of one, more, or preferably all of the following: chromates, chromium, sulfides, polysulfides, silicone, petroleum distillates, and solvents. Chromates and chromium have been said to raise environmental concerns, as have polysulfides. Sulfides may promote drying out. Silicone may affect paint adhesion. Solvents and petroleum distillates may cause environmental and/or adhesion issues. The applicant has observed that some of the foregoing may also affect the ability of a composition to be an effective sealant for corrosion inhibiting purposes.

The inventions also include methods of applying the CIPs and aircraft assemblies to which they may be applied.

DETAILED DESCRIPTION

Figure 1:
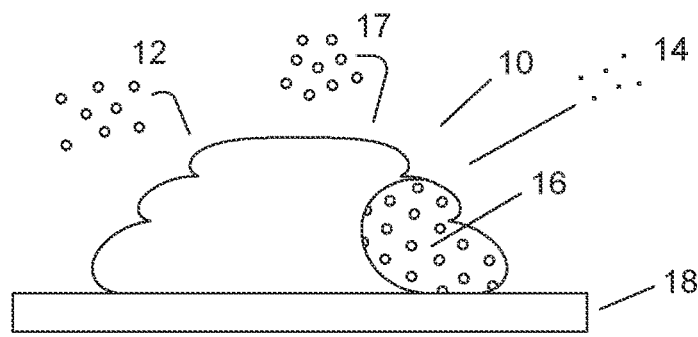
FIG. 1 illustrates components of applicants' CIPs on an aircraft substrate.

FIG. 1 illustrates a corrosion inhibiting paste 10 which includes a base 16, further including a mix, the mix may add to the base 16 one or more of the following additional components: metallic particles 12 (coated or uncoated, in some embodiments 1-300 microns longest dimension) or non-metallic corrosion inhibitors 14, such as corrosion inhibiting powders (typically less than a micron in longest dimension), and inert particles 17, for example, polymer spheres or fibers (which may be 10 nano to 100 microns in their longest dimension). The corrosion inhibiting paste 10 and, may be spread on or applied to a substrate 18 which may be a metallic aircraft part or assembly.

Applicant's corrosion inhibiting pastes typically have a paste consistency, a viscosity in some embodiments between 9,000 and 10,000,000 cP. A paste is, at room temperature, a non-curing, thick, soft, spreadable, moist substance, that may be dispensed from a container, such as by a spatula or a brush, by squeezing from a tube, cartridge, or applicator (for example, syringe type) but will hold its shape on and stick (adhere, but not bond) to a substrate including a metal such as aluminum alloy or a carbon fiber reinforced plastic substrate. It may in some embodiments flow under pressure but sets up (thickens) and holds its shape when the pressure is released. This property may be referred to as thixotropic. In preferred embodiments, a curing agent is not used with the paste.

Applicants' corrosion inhibiting pastes, including the base 16, are able to stand a wide variety of time-temperature conditions without drying out or excessively hardening, cracking, or flowing. They, in some embodiments, may be able to withstand attack from aircraft fuels (such as Jet A) or other aircraft fluids (hydraulic fluids, including Skydrol). They may be hydrophobic and non-hygroscopic. The paste may substantially maintain its properties over a wide temperature range. In some embodiments, the pastes are resistant to flow at elevated temperatures when applied on an aluminum alloy (2024) substrate mounted perpendicular (20 mils thick, 7 days, 95° C.).

The corrosion inhibiting pastes may include inert particles 17, which may include spheres or fibers, such as polymer fibers, including polyethylene, PTFE, polypropylene, HDPE, or polyolefin fibers or a mix thereof. These inert particles may be hydrophilic or hydrophobic. These inert particles may be non-reactive polymer particles with different shapes. These, in some embodiments, may be 0.1 mm long (0.01-1.0 mm range), and 5 microns in diameter (1-10 micron range), having a surface area of 12 $m^2$/gr. It is believed they help hold the paste together (coherence), especially when the metallic particles are added. They are typically non-reactive to both the base (or any other component of the paste) and the substrate to which it is applied. The addition of inert particles 17 such as mica and silicates, to the base, may also add to the toughness of the corrosion inhibiting paste or change its flow characteristics. Titanium dioxide is another inert particle that may be added as a colorant.

The non-hygroscopic nature of the paste may be shown by 7 days of immersion in tap water at 70° F., with no material change in weight (less than 1%). The paste may be used on aircraft surfaces, and such ability to resist corrosion may be demonstrated by no significant visible corrosion (less than about 5% surface area) nor loss of cohesion or adhesion after the following test: 3000-hour salt fog (B117).

The particles of corrosion inhibiting paste 10 seen in FIG. 1 may, in some embodiments, be metallic particles 12 and/or inert particles 17. The addition of metallic particles to the base will, primarily, enhance corrosion resistance (including resistance to galvanic corrosion) of the corrosion inhibiting paste as well as help determine flow characteristics. The particles 12/17 may be flake-like, oblong, rod-shaped, irregular in shape, or spherical. They may be 1 micron to 300 microns in their longest dimension (preferred range 1-200 microns for metallic particles). They may be mixed into the base at a weight loading (compared to the total weight of the corrosion inhibiting paste) between 20-85%, more preferred 40-65%, mixed in uniformly so the corrosion inhibiting paste is smooth (homogenous and without lumps).

Metallic particles 12 (as distinguished from inert particles 17) may be coated or uncoated metal in some embodiments aluminum or aluminum alloy including an alloy of the 2000, 3000, 4000, 5000, 6000, and 7000 series. The particles, prior to mixing with the base 17, may be coated with a coating that will inhibit the natural oxidation of the aluminum (or other metal) so as to aid in electrical conductivity when added to the base. Metallic particles, especially coated aluminum alloy, will function to help the aircraft joint or wet installed fastener to resist galvanic corrosion that may occur when dissimilar metals are close to one another in the presence of an electrolyte. The metallic particles, especially coated aluminum, may act as a sacrificial anode. The metallic particles include the particles set forth in U.S. Pat. Nos. 8,277,688 and 8,262,938, (the "Navy patents") incorporated herein by reference. These patents disclose coated aluminum alloy particles in a paint binder, acting to inhibit corrosion when the paint is applied to a metal substrate. These patents also disclose the use of magnesium or zinc particles (or alloys thereof) In their use as disclosed herein, the coated particles are used mixed with a base.

The referenced Navy patents disclose a number of conductive or semi-conductive coatings for metal particles including aluminum alloy particles. Applicant has found these coated particles remain electrically active when mixed into applicant's base and help prevent corrosion of metals more cathodic than the particles and/or the metal particle is more anodic than the substrate. These particle coatings may be free of chromates, that can be harmful to the environment. Some of the metal particle coatings are derived from an aqueous trivalent chromium solution. Other metal coatings are free of any chromium, see U.S. Ser. No. 17/655,298, filed Mar. 17, 2022 (for coatings derived from a molybdate solution), incorporated herein by reference.

A chromium-free, molybdate-based aluminum alloy reactive liquid aqueous solution is disclosed in U.S. Ser. No. 17/655,298 leaving oxidation reaction products on aluminum particles which in turn are combined with binders such as binders used for paint or other material. Optionally, organic or ionic-based or other corrosion inhibitors may also be added to the base. The result is a paste that is used to help prevent corrosion of metallic substrates, in part due to the coated alloy particles acting as sacrificial anodes.

The molybdate-based coating that may be used for coating the metal particles 12 including aluminum alloy particles, in some embodiments is prepared from an aqueous solution comprising a molybdate, a permanganate, and a hexafluoro zirconate, adjusted to a pH range of 0-14 (but preferably acidic), and applied to the particles to form an electrically conductive or semi-conductive corrosion preventative coating (typically about 1 nanometer-5 micron thick). The coated particles, in some embodiments, are mixed into the base to form a corrosion inhibiting paste.

In some embodiments the molybdate of the aqueous solution is a potassium molybdate ($K_2MoO_4$), the permanganate is potassium permanganate ($KMnO_4$), and the hexafluoro zirconate is potassium hexafluoro zirconate ($K_2ZF_6$). These components' molar range is in some embodiments from 0.001-0.50 moles per liter for each. In some embodiments, the pH of the aqueous solution may be adjusted with potassium hydroxide or sulfuric acid to be basic or acidic with a pH in the range of 0-14. To increase surface growth and reaction efficiency, an ionic barium or boron salt may be added, to act as a pH buffer. The solution deposits a semi-conducting corrosion inhibiting molybdate oxide-based coating onto the aluminum alloy particles and reduces or eliminates particle self-corrosion when the coated particles are added to base 16 which may be applied to a metal substrate such as aluminum alloy. For galvanic corrosion protection, metal particles may be those that are more non-noble relative to the metallic substrate. The coatings, in some embodiments, may passivate the metal particles to form a conversion coating on the surface thereof.

A chromium containing semiconductive corrosion-inhibiting coating to an aluminum alloy or other metal particle may be derived by soaking a particle in an acidic aqueous solution of from about:

0.01 to 22 parts trivalent chromium compound;
0.01 to 12 parts hexafluoro zirconate;
0.01 to 12 parts of at least one fluorocarbon, which may be selected from the group comprising tetra fluoroborates, hexafluoro silicates, and hexafluoro titanates; and may include at least one divalent zinc compound and 0.00 to 5 parts by weight of a water-soluble organic corrosion inhibitor. The divalent zinc may be zinc sulfate. A stabilizing compound such as polyhydroxy or carboxylic compounds may be used. The metal particles may be aluminum which may be alloyed with zinc, cadmium, magnesium, barium, manganese, indium, gallium, tin, and bismuth.

A process to apply a trichromium-based semi-conductive corrosion-inhibiting coating to active aluminum alloy pigments follows. To one liter of distilled water, add 3.0 grams of basic chromium sulfate, 4.0 grams of potassium hexafluoro zirconate, and 0.12 grams potassium tetrafluoroborate. Stir solution until all chemicals are dissolved. Let stand for seven days before use to allow for the inorganic polymer of chromium sulfate to complex with the fluoride salts and equilibrate. Dilute this solution to 40% by volume with distilled water.

Approximately 100 grams of Al-5% Zn-0.015% In particles were added to a one-liter flask. Particles processed were 40 to 100 microns in diameter and spherical. To the flask, add approximately 500 milliliters of inorganic polymer solution at ambient conditions and agitate or stir for approximately five minutes. The powder tends to settle quickly in the solution so constant agitation is necessary. After 5 minutes, decant off the inorganic polymer solution.

The wet powder was added slowly to a large Buchner funnel with filter paper. After wet slurry was added, a vacuum was applied. The powder was rinsed approximately three times with distilled water to remove unreacted inorganic polymer solution. After rinsing, the powder cake and filter paper were removed and placed on a large watch glass and allowed to dry at ambient conditions overnight. In the morning, the coated powder was dry to handle and placed in a glass container, and sealed.

Corrosion inhibitors 14 may be the lithium salt-based inhibitors found in US2012/025142 and U.S. Pat. No. 10,889,723 incorporated herein by reference. Corrosion inhibitors may be one or more polycarboxylates and may also include synergistic polycarboxylate blends as found in US2018/0282555 incorporated herein by reference. Other corrosion inhibitors may be found in the following Navy publications: U.S. Pat. Nos. 8,262,938; 8,277,688; 9,243,333; 9,243,150; PCT/US15/65301 and PCTU516/16509, all of the foregoing in this paragraph or incorporated herein by reference. The corrosion inhibitors may be loaded into base 16 at 0.0-70% by weight of the final corrosion inhibiting paste. In some embodiments, the corrosion inhibitors are relatively insoluble and have a solubility of less than 100 milligrams per liter. In some embodiments, any semisolid phosphate salt may be used in the paste as a corrosion inhibitor.

Corrosion inhibiting pastes for aircraft use include applications to a joint, as anti-seize or the wet installation of fasteners for aircraft use or use on an aircraft part. It may also be used as a topcoat on a metal substrate. The corrosion inhibiting paste comprises a non-hardening, one-part, solvent-free, hydrophobic, non-shrinking organic polymer base having uniform consistency, and in some embodiments, a viscosity of between 300 to 10,000 centipoises at 20° C., the base typically free of chromium, including chromates, sulfides, silicone, and petroleum distillates, solvents, and particles, loaded sufficiently to result in a viscosity of between, in some embodiments, about 9,000 and 10,000,000 centipoise. Further, the paste may include non-metal powder-sized corrosion inhibitors and particles that are inert particles and/or metal particles.

The paste may include at least one corrosion inhibitor selected from the group comprising a lithium salt, an organic or inorganic lithium salt, lithium phosphate, a cation phosphate, lithium carbonate, at least one metal polycarboxylate, magnesium-containing materials, a cation polycarboxylate, magnesium oxide, oxyaminophosphate salts of magnesium, magnesium carbonate and magnesium hydroxide, magnesium citrate, magnesium oxalate, zinc citrate, zinc oxalate, organometallic compounds and a combination thereof.

The blend of inhibitors may consist of lithium phosphate and at least one inhibitor chosen from the following:

Anions: polycarboxylates chosen from linear and branched aliphatic molecules like oxalate, citrate, tartrate, succinate, and adipate, and aromatic molecules like phthalate, diphenate, mellitate, and trimellitate. These are examples of some possible molecules; there are many other polycarboxylates which can be used in the combination. Cations: elements chosen from Group IIa—Magnesium, calcium, strontium, and barium Group IIIB—Scandium, yttrium, lanthanum, and the other lanthanides like cerium, praseodymium, neodymium, samarium, europium, gadolinium, etc. Group IVb—Titanium and zirconium Group Vb—Vanadium and niobium Group VIb—Chromium and molybdenum Group VIIb—Manganese Group VIII—Iron, cobalt, and nickel Group Ib—Copper Group IIb—Zinc Group IIIa—Aluminum Group Va—Bismuth.

Inhibitors may be blended with different molar ratios to obtain the maximum synergistic performance for a particular application. Inhibitors may also be used at varying concentrations in the particular vehicle for the application. Inhibitors may be combined in bulk after synthesis, or they may be blended during synthesis. For example, additional or different synergistic effects may be garnered by reacting oxalic acid with zinc nitrate and magnesium nitrate to achieve a compound with a mixed complex of zinc and magnesium oxalate. The solubility synthesized zinc oxalate and magnesium oxalate compounds.

Corrosion inhibitors 14 may include lithium salts (which may be added to base 1-40% by volume), metal polycarboxylate, and chromium-free inhibitors. The corrosion inhibitor may be ionic or organic. The corrosion inhibitors may be lithium free. The corrosion inhibitors may comprise lithium-free synergistic combinations of metal oxalates, metal pirates, metal succinate, metal tartrates, and metal adipate.

U.S. Pat. No. 10,351,715 incorporated herein by reference, discloses metal polycarboxylate corrosion, one or more of which may be mixed into the paste disclosed herein.

The corrosion-resistant inhibitors consist essentially of synergistic combinations of:
A. At least one metal polycarboxylate derived from a stoichiometric reaction of metal compounds and polycarboxylic acids to obtain polycarboxylic metal salts and
B. At least one metal polycarboxylate derived from a stoichiometric reaction of metal compounds and polycarboxylic acids to obtain polycarboxylic metal salts, wherein either the metal or the polycarboxylic acid in at least one of the polycarboxylic metal salt combinations is different from the other combination of polycarboxylic metal salts.

For example, where the corrosion-resistant synergistic combination consists of from about 0.1 to 20 parts by weight of zinc oxalate and from about 0.1 to 20 parts by weight of zinc citrate, it is important that either the zinc or the polycarboxylic acid of the polycarboxylic metal salt of either paragraph (A) or (B) be different. It is important that where the carboxylic metal salts are derived from the stoichiometric reaction of several different metal compounds and several different polycarboxylic acids, it is essential that at least one of the polycarboxylic metal salts has a different anion or cation from any of the other polycarboxylic metal salt.

In some embodiments, the paste by non-volatile weight of the film forming composition may be: 30-95% base, 10-70% metal particles (coated, uncoated or mixed), inert particles 0-40%, and 0.0-70% corrosion inhibitor (alternately 0.0-40%).

Figure 2A:
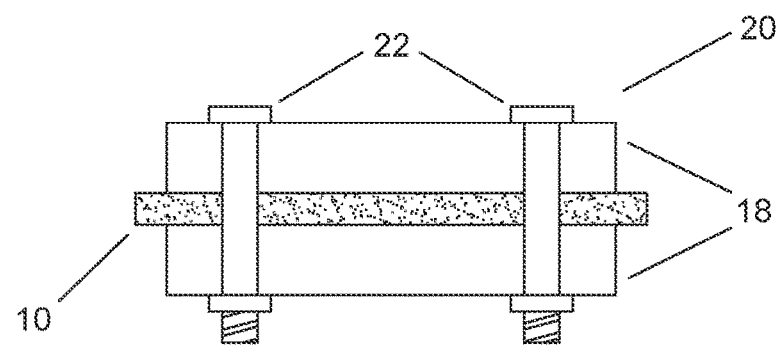
FIGS. 2A and 2B illustrate the use of the applicant's CIPs on an aircraft part namely, a static joint.
Figure 2B:
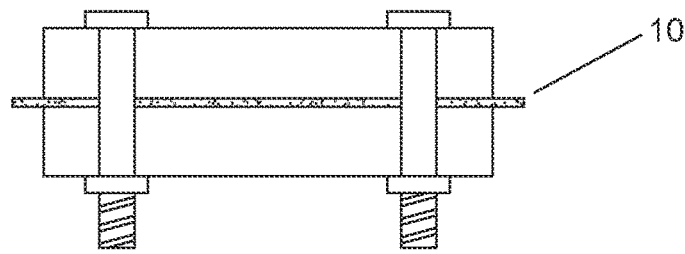

FIGS. 2A and 2B illustrate the use of corrosion inhibiting paste 10 in an aircraft assembly 20, the assembly in this embodiment comprising two or more aircraft parts or members 18 (which may include aluminum or CFRP members) attached and under compression by fasteners 22, such as a joint formed by rivets or threaded fasteners 22 as shown here. FIG. 2A illustrates a joint with the corrosion inhibiting paste between the faying surfaces prior to compression where the corrosion inhibiting paste may be, in some embodiments, 2-500 mil thick. FIG. 2B illustrates the joint post compression where the thickness of the corrosion inhibiting paste 10 may be 0.25-10 mil or in some embodiments, up to 20 mil in thickness. Applicant's corrosion inhibiting pastes may be used to seal cracks, small voids, pinholes, gaps, mating areas, and seams and applied to fay surfaces or fasteners.

Figure 3A:
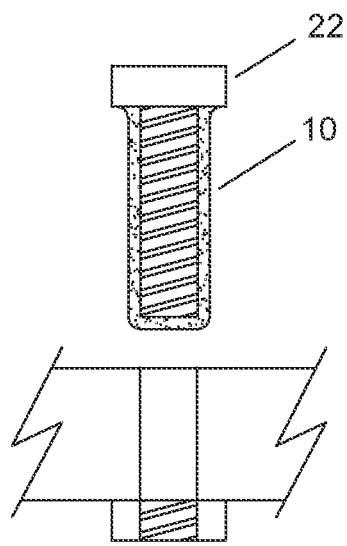
FIGS. 3A and 3B illustrate the use of the applicant's CIPs on the wet installation of a fastener.
Figure 3B:
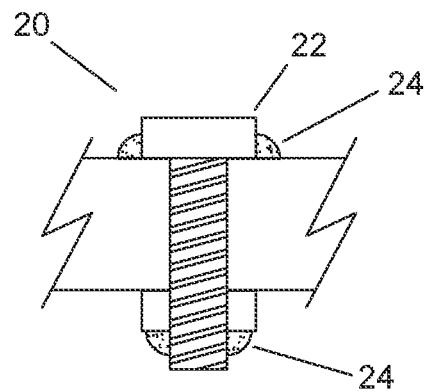

FIGS. 3A and 3B illustrates the "wet installation" of fastener 22 (rivet, threaded, screw, etc.) into an aircraft part. FIG. 3A illustrates the fastener coated, at least partly, with paste 10, typically 1-10 mil, prior to installation. The fastener or any other substrate may be coated with CIP by spraying, dipping, brushing, or any other suitable manner including dispensing from a syringe.

In some embodiments the CIP 10 viscosity is between 10,000 and 10,000,000 cP at room temperature and, in some embodiments, may be easily spread at room temperature (no heating required). Viscosity, in some embodiments, may be adjusted by varying the loading of particles 12/17. In some embodiments, the viscosity is in the range of 20,000 to 400,000 cP at 20° C. (15,000-750,000 in other embodiments). In one measure of flow, squeeze out from a Semco 440 nozzle (0.125" diameter) at 90 psi (±5 psi) was 5315 grams/minute at 70° F. and 1542 grams/minute at 40° F. The paste may achieve flow rates of between 1000 g/min to 10,000 g/min at 90 p.s.i., 70° F. and is therefore described as "flowable". The paste may achieve high UV resistance by adding UV blockers such as titanium oxide or carbon black.

FIG. 3B illustrates the fastener after securement into the aircraft part, properly torqued, with some squeeze-out 24 which may be cleaned off a metal surface with a clean, dry cloth. Notably, applicant's paste may be cleaned up with or without a cleaner (such as a citrus-based cleaner, isopropyl alcohol, or mineral spirits). Sometimes, just a clean, dry cloth may be used to wipe off the paste. It has been noted that the CIP with metal particles acts not only to inhibit corrosion but to act as an anti-seize agent allowing easy removal of the fastener at a later time. The ease of removal is found with using the paste in aircraft joints also and is achieved even through seven thermal (−40° F. to 120° F.) and pressure (1.0 to 0.1 atm) cycles (18 hours on, 6 hours off) over a range of 50-100% RH (relative humidity).

The paste is typically smooth and tacky to the touch, like toothpaste in that regard. It maintains the non-drying and thixotropic properties in a temperature range of −67° F. to 203° F., including non-sag at thicknesses less than 0.020 inches (aluminum vertical). It does not bake on the substrate or bond to surfaces as an adhesive or paint may.

A base is available from KBS Chemical, Dodd City Texas as part number 06429. Metal particles are available in a number of sizes and compositions including aluminum alloy particles coated with a trivalent chromium passivation coating as disclosed in the Navy patents, incorporated herein by reference. Part numbers: (TCP treated) ARP-02-04, ARP-02-08, ARP-02-25, (Non-treated) AP-03-04, AP-03-08, AP-03-25, (Chrome Free treated) ARP-06-04, ARP-06-08, ARP-06-25, ARP-07-04, ARP-07-08, ARP-07-25. The particles may be those molybdate coated particles found in U.S. Ser. No. 17/655,298, filed Mar. 17, 2022, incorporated herein by reference.

Applicant's CIP is resistant to drying, 75 grams were tested at about 20 mil thickness on a vertical aluminum coupon, for 7 days at 95° C., very little shrinkage or drying in some embodiments, less than 3% weight loss (that is, non-drying). As it is insoluble in water (less than 0.22%), it is ideal for preventing wicking between faying surfaces.

Applicant's CIP passed qualitative (visual) evaluation (less than 10% surface area affected) in a sandwich corrosion test based on ASTM F 1110-09, using 2024 T-3 and 7075 T-6 Al clad coupons. No significant discoloration or pitting was found. These tests were performed with Example A1, KBS base, and 50% (by weight to base) loading of trivalent chromium coated aluminum particles (2-200 micron). Examples A2, A3, B1, B2, and C1 are set forth below and proved to be satisfactory in inhibiting corrosion.

In some embodiments, the corrosion inhibitors 14 are a mix of two or more parts. In some embodiments, the corrosion inhibitors 14 are a mix of three parts with any one part being at least 10% by weight of the total weight of the corrosion inhibitor component.

Example A1 four-part mix (base, metal particles, inert particles, corrosion inhibitors) includes a base (KBS), treated aluminum alloy (Zn/In, 2-100 micron, tri-chromium passivation coating), inhibitor mix (1 part Zn citrate, 0.5 part Zn oxalate, 0.3 part insoluble lithium phosphate), and inert polymer fibers as a thickener. Example A2 four-part mix (base, metal particles, inert, corrosion inhibitors) includes a base (KBS), treated aluminum alloy (Zn/In, 2-100 micron, tri-chromium passivation coating), inhibitor mix (1 part Zn citrate, 0.5 part Zn oxalate), and inert polymer fibers as a thickener. Example A3 four-part mix (base, metal particles, inert, corrosion inhibitors) includes a base (KBS), untreated magnesium particles, inhibitor mix (1 part Zn citrate, 0.5 part magnesium oxalate, 0.3 part insoluble lithium phosphate), and inert polymer fibers as a thickener.

Example B1 three-part mix (base, metal particles, inert particles, no corrosion inhibitors) includes a 50/50 base/metal, particles 1-20 micron, TCP treated or untreated Aluminum alloy (Zn/In/Sn). Example B2 three-part mix (base, metal particles, inert particles, no corrosion inhibitors) includes a 50/50 base/metal, particles 21-200 micron, TCP treated or untreated Aluminum alloy (Zn/In/Sn).

Example C1 three-part mix (base, inert particles, corrosion inhibitors, no metal particles) includes a base (KBS), inhibitor mix (1 part Zn citrate, 0.5-part Zn oxalate, 0.3 part insoluble lithium phosphate), and inert polymer fibers as a thickener to a viscosity of between 15,000 cP and 750,000 cP.

These examples in the viscosity ranges indicated will result in a CIP with beneficial corrosion inhibiting properties.

Any combination of the following are included as embodiments: particles (inert, coated, uncoated), inhibitors, mixed to the referenced viscosity ranges may comprise the paste.

In the preceding description, for purposes of explanation, numerous details are set forth in order to provide a thorough understanding of the embodiments. However, it will be apparent to one skilled in the art that these specific details are not required. In other instances, well-known structures and components are shown in block diagram form in order not to obscure the understanding.

The above-described embodiments are intended to be examples only. Alterations, modifications and variations can be affected to the particular embodiments by those of skill in the art. The scope of the claims should not be limited by the particular embodiments set forth in the examples but should be given the broadest interpretation consistent with the specification as a whole.

The invention claimed is:

1. A corrosion inhibiting paste for aircraft use including use with: a joint, as anti-seize or the wet installation of fasteners for aircraft use or use on an aircraft part, the corrosion inhibiting paste comprising:
   a non-hardening, one-part, solvent-free, hydrophobic, non-shrinking organic polymer base having uniform consistency, having a viscosity of between 300 to 10,000 centipoises at 20° C., and having a molecular weight between 1,000 and 100,000, the base being free of chromium, including chromates, sulfides, silicone and petroleum distillates, and solvents; and,
   particles, loaded into the base sufficiently to result in a viscosity of between 9,000 and 10,000,000 centipoise.

2. The paste of claim 1 wherein the particles are coated metal particles.

3. The paste of claim 2 further including a corrosion inhibitor.

4. The paste of claim 3 wherein the particles are coated metal particles in the range of 1 to 300 microns in their longest dimensions.

5. The paste of claim 3 wherein the coated metal particles are aluminum including aluminum alloy.

6. The paste of claim 5 wherein the coated metal particles are coated with an electrically conductive or semi-conductive coating.

7. The paste of claim 6 wherein the coating is a TCP (Trivalent Chromium Passivation).

8. The paste of claim 6 wherein the coating is a molybdate coating.

9. The paste of claim 3 further including inert particles.

10. The paste of claim 2 wherein the coated particles are loaded at a range of 10 to 85 percent of the total paste weight.

11. The paste of claim 3 wherein;
   the coated metal particles include metal particles in the range of 1 to 200 microns in their longest dimensions;
   the coated metal particles are aluminum including aluminum alloy; and
   wherein the coated metal particles are coated with an electrically conductive or semi-conductive coating.

12. The paste of claim 3 wherein the paste is non-hygroscopic.

13. The paste of claim 3 wherein the paste is resistant to drying.

14. The paste of claim 3 wherein the paste passes the 3000-hour salt fog test on an aluminum alloy substrate.

15. The paste of claim 3 wherein the paste is used to coat at least a part of an aircraft assembly.

16. The paste of claim 3 wherein said corrosion inhibitor includes one of a: lithium salt, a mixed complex of zinc and magnesium oxalate, a metal polycarboxylate, a magnesium salt, a salt phosphate, or is a chromium-free corrosion inhibitor.

17. The paste of claim 3, wherein the corrosion inhibitor is one of: ionic, a covalent organometallic, or organic.

18. The paste of claim 3, including at least one corrosion inhibitor selected from the group comprising: a lithium salt, an organic or inorganic lithium salt, lithium phosphate, a cation phosphate, lithium carbonate, at least one metal polycarboxylate, non-metallic magnesium-containing materials, a cation polycarboxylate, magnesium oxide, oxyaminophosphate salts of magnesium, magnesium carbonate and magnesium hydroxide, magnesium citrate, magnesium oxalate, zinc citrate, zinc oxalate, organometallic compounds and combinations thereof.

19. The paste of claim 3, wherein the corrosion inhibitor is lithium free.

20. The paste of claim 1 wherein the base is non-adhesive to a metal substrate.

21. The paste of claim 3 wherein the coated metal particles are one or more of the following: Aluminum, Magnesium, Zinc, or alloys thereof.

22. The paste of claim 21 wherein at least some of the coated metal particles are coated with an electrically semi-conductive or conductive coating.

23. The paste of claim 3, comprising by non-volatile weight of the corrosion inhibiting paste composition:
   30-95% base;
   0.0-40% inert particles;
   10-70% coated metal particles; and
   up to 70% corrosion inhibitors.

24. The paste of claim 23 wherein the coated metal particles are coated with an electrically semi-conductive or conductive coating.

25. The paste of claim 24 wherein the paste further includes at least one of an ultraviolet light blocker or a colorant.

* * * * *